J. M. ROTH.
ELECTRICALLY HEATED MOLD.
APPLICATION FILED NOV. 24, 1915.
1,199,428.
Patented Sept. 26, 1916.
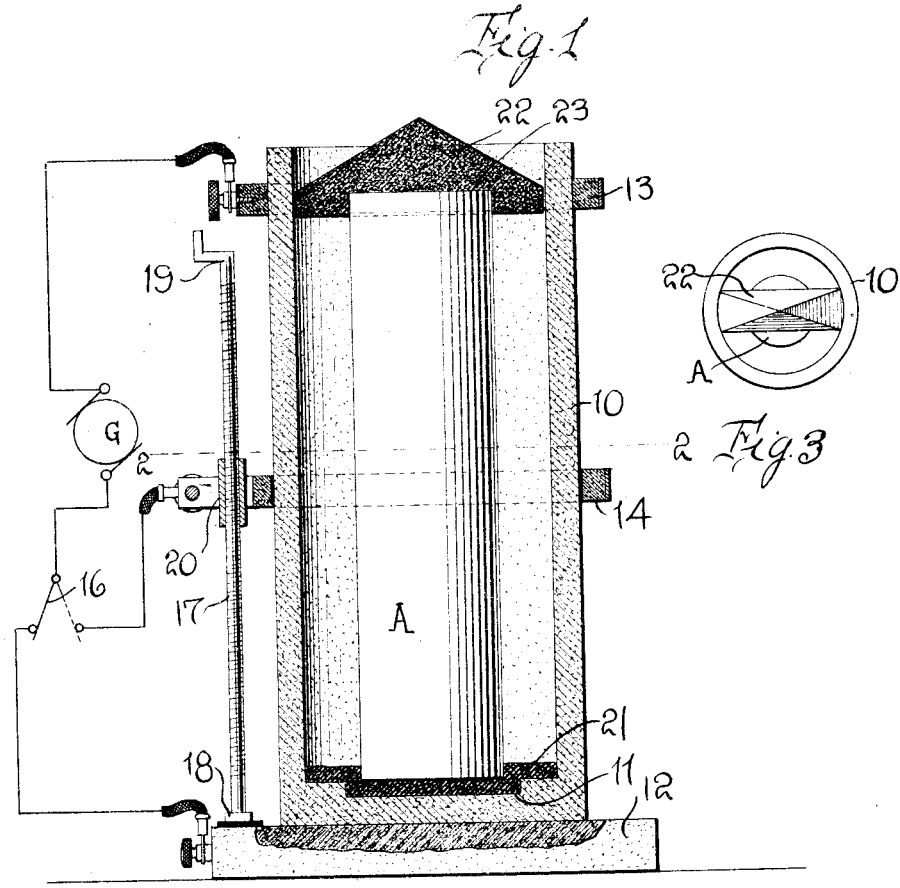
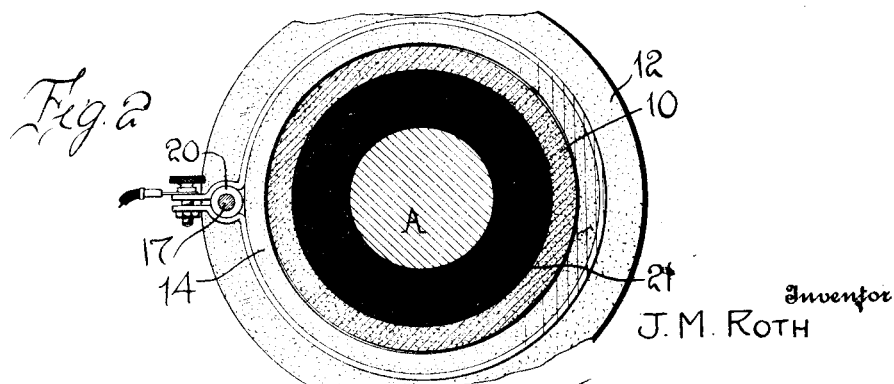
Inventor
J. M. Roth
By Watson E. Coleman
Attorney

UNITED STATES PATENT OFFICE.

JACOB M. ROTH, OF PITTSBURGH, PENNSYLVANIA.

ELECTRICALLY-HEATED MOLD.

1,199,428.  Specification of Letters Patent.  Patented Sept. 26, 1916.

Application filed November 24, 1915. Serial No. 63,173.

*To all whom it may concern:*

Be it known that I, JACOB M. ROTH, a citizen of the United States, residing at Pittsburgh, in the county of Allegheny and State of Pennsylvania, have invented certain new and useful Improvements in Electrically-Heated Molds, of which the following is a specification, reference being had to the accompanying drawings.

This invention relates to molds used in the process of welding an exterior lining of non-ferrous metal to an interior core of ferrous metal, as described in my pending application for U. S. Patent filed March 27, 1915, Serial No. 17,486.

My present application relates specifically to means for heating the mold and for heating the interior core and keeping the molten metal surrounding this core hot for a predetermined period, and the general object of my invention is the provision of an electrically heated mold in which the heating means are so disposed that the interior core is raised in its temperature by the heat radiated from the mold itself and not by electrically heating the core.

A still further object is to provide means whereby the heat may be applied at first uniformly throughout the whole extent of the mold and then reduced progressively as regards the lower portion of the mold so that the fluid metal in the upper portion of the mold will remain fluid after the metal in the lower portion of the mold has to a certain extent congealed so that any air bubbles or any air or gas which may be contained in the less fluid metal will rise upward through the more fluid metal and escape, thus preventing the formation of blow holes or air holes in the composite billet formed in the mold.

Another object is to provide in connection with a mold formed of electrically resistant material, electrodes disposed at opposite ends of the mold whereby a current of electricity may be passed through the entire length of the mold to thus heat it uniformly and provide an electrode which is movable along the length of the mold, means being provided for cutting off the passage of current to one of the first-named electrodes and allowing it to pass through the last-named electrodes so that the length of travel of the current through the mold may be gradually shortened as the movable electrode moves toward the open end of the mold.

Other objects will appear in the course of the following description.

My invention is illustrated in the accompanying drawings, wherein:

Figure 1 is a vertical section of a mold and the heating means therefore, constructed in accordance with my invention, the figure showing a core in place within the mold; Fig. 2 is a section on the line 2—2 of Fig. 1; Fig. 3 is a top plan view of the mold and head piece.

Referring to these drawings, 10 designates a mold of any suitable character, but preferably made of plumbago, a mixture of graphite and clay in proper proportions, so that the mold has electrical resistance, and illustrated as being formed with a recess 11 in its bottom for the purpose of centering a core A which may be of steel or other ferrous metal. Below the mold 10 there is disposed a graphite block or base electrode 12 upon which the mold rests. Surrounding the upper end of the mold is a graphite annulus 13 forming an electrode. This is preferably fixed in position. Surrounding the body of the mold and movable vertically thereon is an electrode 14 which is preferably of graphite or other resistant material, and which is vertically adjustable upon the mold and closely surrounds and is in contact with it. The electrode 13, and the block 12 which forms the base electrode, are normally connected in circuit with a source of current of any suitable character, designated generally G. The vertically movable electrode 14 is connected in an interrupted circuit or may be connected in circuit with said source of current and a switch 16 is provided whereby the graphite block 12 may be cut out of circuit with the source of current G, leaving the electrode 13 in said circuit and whereby the electrode 14 may be disposed in circuit with said source of energy.

I do not wish to be limited to any specific means for vertically shifting the electrode 14, but I have illustrated for this purpose in Fig. 1 a vertically disposed screw threaded member 17 which is rotatably mounted upon a suitable base 18 and which at its upper end has a handle 19. The electrode 14 has a member 20 which has screw threaded engagement with the screw 17. It will be obvious, therefore, that as this screw 17 is rotated in one direction the electrode 14 will be raised and as the screw 17 has a length nearly equal to that of the mold 10 the electrode 14 may be raised nearly the full height of the mold.

In the practical use of my invention the core A, which is assumed to be of steel, is disposed within the mold 10, the lower end of this core being insulated from the bottom of the mold by means of a luting of clay or other insulating material designated 21. After the core is disposed within the mold the head piece 22 is disposed upon the upper end of the core. This head piece as illustrated in Fig. 3, is approximately rectangular in form, has rounded ends which fit the inner face of the mold wall, and is inclined upon its upper face so as to direct the stream of molten metal into the space between the mold and the core and prevent the accumulation of the molten metal upon the upper face of the head piece. This head piece is to be made of clay or like material. After the core has been put in position and the head piece 22 has been placed thereon, this head piece centering the core by means of the centering recess 23, and the electrodes 13 and 12 are connected to the source of current. The mold being of resistant material, the current passing through the mold from one electrode 12 to the electrode 13 raises the temperature of the mold to a high degree. The core A is heated by radiation from the mold itself and not by any direct application of heat. No current passes into the core but the core is heated indirectly by radiation from the wall of the mold. When the mold and the core have been raised to the proper temperature the molten metal is poured into the mold as before described, until it fills the space between the core and the mold. It is now desirable to allow the metal to cool gradually and it is desirable and it is an object of my invention to provide for cooling the lowest portion of the molten metal first and allow the molten metal to cool gradually upward and not uniformly throughout its entire extent. To this end the electrode 14 is shifted to its lowest position just before the molten metal is poured into the mold and current is cut off from the block 12. Then as the molten copper is poured into the mold the electrode 14 is gradually raised by the mechanism illustrated in Fig. 1, or other suitable mechanism, slightly in advance of the surface of the molten metal, so that the heat is gradually carried upward upon the mold wall and as the electrode is raised that portion of the mold below the electrode is allowed to cool so that the fluid metal within the mold also cools. Thus the cooling of the fluid metal is continued upward through the mass. Thus at any stage of the process, except the last, the lowest portion of the metal is relatively cool while the portion above it is very fluid and as a consequence any air or other gas which may be contained within the less fluid metal will rise upward through the more fluid metal and escape from the top of the mold. It will be seen that as the electrode 14 is raised or shifted toward the electrode 13, the portion of the mold through which the current passes and which is thereby heated through the action of the current is gradually reduced, thus causing the lower portion of the mold to gradually cool while the upper portion is kept hot, this heating area being gradually reduced as the element 14 moves upward.

I, of course, do not wish to be limited to any particular construction of mold, any particular form of core, or any of the exact details illustrated, as the drawings merely show the general idea of my invention and not the manner in which it might be modified to suit various circumstances.

It will be seen that the gist of my invention lies in heating the core indirectly by the radiation from the mold wall and applying heat first uniformly to the mold and then gradually shifting the heat applying means toward the upper end of the mold so that a progressive congelation is secured.

In order to prevent the flotation of the core A when molten metal is poured into the mold or rather prevent the relative buoyancy of the core from causing it to rise to an extent sufficient to carry the lower end of it out of the seating recess in the non-conducting layer 21, I may provide means for limiting the upward movement of the cap piece 22 and therefore of the core such as is shown in my pending application Serial No. 63,171, filed on the 24th day of November, 1915, and inasmuch as this forms no part of my present invention I have not illustrated any such means.

Having described my invention, what I claim is:

1. An improvement in the art of casting a metallic sheath upon a metallic core consisting in disposing a metallic core within a mold and in spaced relation to the wall thereof, heating the mold directly and by radiation only heating the core to the welding point of the two metals and then pouring molten metal into the space between the core and mold to thereby form a sheath.

2. An improvement in the art of casting a metallic sheath upon a metallic core consisting in disposing a metallic core in a mold of electrically resistant material and in spaced relation to the wall thereof, passing a current of electricity through the mold to thereby directly heat the mold and by radiation only heat the core to the welding point, pouring molten metal into the mold to surround the core and progressively reducing the heat of the lower portion of the mold to thereby cause progressive congelation of the metal within the mold in a direction toward the top of the mold.

3. A mold of the character described having a body of electrically resistant material, electrodes applied to the opposite ends of the mold, an electrode surrounding the mold and movable longitudinally thereof, means for connecting said first named electrodes in circuit with the source of current or cutting out one of said electrodes and connecting the third named electrode and one of the first named electrodes with the source of current.

4. A mold of the character described having a body formed of electrically resistant material and open at one end, electrodes disposed at opposite ends of the mold and in contact therewith, an electrode disposed intermediate the ends of the mold and in contact therewith and longitudinally movable the length of the mold, means for connecting said first-named electrodes in circuit with a source of current and for connecting the movable electrode and the electrode adjacent the open end of the mold in circuit with said source of current, means for gradually longitudinally shifting the movable electrode toward the open end of the mold and means for supporting an object within the mold and insulated therefrom.

5. The combination with a mold formed of electrically resistant material and open at one end, of a base forming a fixed electrode, said base supporting the mold, an annular electrode applied to the upper end of the mold and in contact therewith, an annular electrode surrounding the mold and in contact therewith and movable longitudinally of the mold, means for gradually shifting the movable electrode longitudinally of the mold comprising a screw threaded member extending parallel to the mold, a screw threaded member engaging the first-named member and mounted upon said movable electrode, and means for connecting the base electrode and said first-named annulus with a source of current or connecting the movable annulus with the source of current and disconnecting the base electrode from said source.

In testimony whereof I hereunto affix my signature in the presence of two witnesses.

JACOB M. ROTH.

Witnesses:
 EDWARD W. CARTALDI,
 SIMON F. LOEB.